United States Patent
Aono et al.

(10) Patent No.: US 9,705,588 B2
(45) Date of Patent: Jul. 11, 2017

(54) WIRELESS COMMUNICATION SYSTEM AND WIRELESS COMMUNICATION RECEIVER

(71) Applicant: Hitachi, Ltd., Chiyoda-ku, Tokyo (JP)

(72) Inventors: Masahiro Aono, Tokyo (JP); Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/053,307

(22) Filed: Feb. 25, 2016

(65) Prior Publication Data
US 2016/0261335 A1 Sep. 8, 2016

(30) Foreign Application Priority Data
Mar. 3, 2015 (JP) .................. 2015-040933

(51) Int. Cl.
H04B 7/24 (2006.01)
G01S 13/00 (2006.01)
H04B 7/26 (2006.01)

(52) U.S. Cl.
CPC .................... H04B 7/26 (2013.01)

(58) Field of Classification Search
CPC .... H04B 7/10; H04B 7/26; H04L 5/05; H04L 27/22; H04L 2027/0067; H04L 2209/80
USPC ....... 455/39, 42, 60; 342/188, 361, 363, 365
See application file for complete search history.

(56) References Cited

U.S. PATENT DOCUMENTS

| 3,093,824 | A | * | 6/1963 | Ammerman | H04B 7/10 342/365 |
| 3,760,274 | A | * | 9/1973 | Vogt | H04B 14/008 342/361 |
| 4,198,641 | A | * | 4/1980 | Gibson | H01Q 25/001 342/361 |
| 8,736,396 | B2 | * | 5/2014 | Okada | H01P 1/17 333/135 |
| 8,811,525 | B2 | * | 8/2014 | Eom | H01Q 1/246 375/259 |

(Continued)

FOREIGN PATENT DOCUMENTS

JP 2002-513537 A 5/2002
WO WO 98/50983 A1 11/1998

Primary Examiner — Quochien B Vuong
(74) Attorney, Agent, or Firm — Crowell & Moring LLP

(57) ABSTRACT

A wireless communication system is provided that is capable of enabling more wireless devices to perform concurrent communication using a polarized wave technology. The wireless communication system is configured from carrier wave generation modules and, each of which generates a first carrier wave and a second carrier wave that have mutually different frequencies; a transmitter that has a rotational wave generation module that generates a rotational wave based on the first and second carrier waves; a rotational wave demodulation module that, for the rotational wave that is received, selectively demodulates an electric wave which has a desired rotational frequency, based on a result of multiplying a sine wave that has the same frequency as a frequency of a desired carrier wave and a sine wave that has the same frequency as the desired rotational frequency; and a receiver that has a rotational phase determination module that determines a phase shift of the received rotational wave from an output of the rotational wave demodulation module.

10 Claims, 5 Drawing Sheets

(56) References Cited

U.S. PATENT DOCUMENTS

2004/0127179 A1\* 7/2004 Sasaki ..................... H04B 7/10
455/146

\* cited by examiner

WIRELESS COMMUNICATION SYSTEM AND WIRELESS COMMUNICATION RECEIVER

TECHNICAL FIELD

The present invention relates to a wireless communication system, and more particularly to a wireless communication system and a wireless communication receiver that transmit and receive a rotational wave.

BACKGROUND ART

A technology that is disclosed in PTL 1 has been proposed as a wireless communication system that transmits and receives a rotational wave (circularly polarized wave). In PTL 1, a transmitter has a function of setting a frequency between a given carrier frequency and zero, as a non-linear period path, for the given carrier frequency and transmitting a circularly polarized wave. Then, at a rotational frequency between a frequency of this carrier wave and zero, an electromagnetic wave that has an electric field vector which rotates with respect to a propagation axis is generated and transmitted. Then, it is disclosed that, for example, in a case where three transmission antennas are present, the three transmission antennas transmit electromagnetic waves of which phases are shifted (delayed) by 120 degrees. On the other hand, a receiver demodulates the electromagnetic waves that are received at the same frequency as that in the non-linear period path of the transmitter. Each of the transmitter and the receiver has a phase locked loop (PLL), and demodulates the electromagnetic wave that is received at the same frequency as that at the transmitter side, using the PLL.

CITATION LIST

Patent Literature

PTL: JP-T-2002-513537

SUMMARY OF INVENTION

Technical Problem

However, in PTL 1, because a configuration is employed in which the demodulation is performed at the receiver side as well, using the PLL at the same frequency as that at the transmitter side, if electromagnetic waves (rotational waves) arrive at different frequencies, the electromagnetic waves cannot be identified at the receiver side. Therefore, it is difficult to utilize a frequency band in an effective manner and it is difficult for multiple wireless communication devices (a transmitter and a receiver) to perform concurrent communication.

Accordingly, an object of the present invention is to provide a wireless communication system and a wireless communication receiver that are capable of enabling many more wireless devices to perform concurrent communication using a polarized wave technology.

Solution to Problem

In order to solve the problems described above, according to an aspect of the present invention, there is provided a wireless communication system including: a carrier wave generation module that generates a first carrier wave and a second carrier wave that have mutually different frequencies; a transmitter that has a rotational wave generation module which generates a rotational wave based on the first and second carrier waves; a rotational wave demodulation module that, for the rotational wave that is received, selectively demodulates an electric wave which has a desired rotational frequency, based on a result of multiplying a sine wave that has the same frequency as a frequency of a desired carrier wave and a sine wave that has the same frequency as the desired rotational frequency; and a receiver that has a rotational phase determination module which determines a phase shift of the received rotational wave from an output of the rotational wave demodulation module.

Furthermore, according to another aspect of the present invention, there is provided a wireless communication system including: multiple wireless devices, in which each of the multiple wireless devices includes a carrier wave generation module that generates a first carrier wave and a second carrier wave that have mutually different frequencies; a transmitter that has a rotational wave generation module which generates a rotational wave based on the first and second carrier waves; a rotational wave demodulation module that, for the rotational wave that is received, selectively demodulates an electric wave which has a desired rotational frequency, based on a result of multiplying a sine wave that has the same frequency as a frequency of a desired carrier wave and a sine wave that has the same frequency as the desired rotational frequency; and a receiver that has a rotational phase determination module which determines a phase shift of the received rotational wave from an output of the rotational wave demodulation module, in which the multiple wireless devices have a shared frequency in advance, and in which, among the multiple wireless devices, one wireless device transmits a frequency allocation request to a different wireless device at the shared frequency, and the different wireless device transmits an allocation response including a given rotational frequency to the wireless device that transmits the frequency allocation request.

Furthermore, according to still another aspect of the present invention, there is provided a wireless communication receiver including: two reception antennas that are arranged mutually orthogonal to each other; a rotational wave demodulation module that, for the rotational wave that is received by the reception antenna, selectively demodulates an electric wave which has a desired rotational frequency, based on a result of multiplying a sine wave that has the same frequency as a frequency of a desired carrier wave and a sine wave that has the same frequency as the desired rotational frequency; and a rotational phase determination module that determines a phase shift of the received rotational wave from an output of the rotational wave demodulation module.

Advantageous Effects of Invention

According to the present invention, there can be provided a wireless communication system and a wireless communication receiver that enable many more wireless devices to perform concurrent communication using a polarized wave technology.

For example, multiple wireless devices are enabled to perform concurrent communication at the same frequency at the same time.

Problems, configurations, and effects other than those described above are made clear by the following descriptions of embodiments.

DESCRIPTION OF EMBODIMENTS

Figure 1:
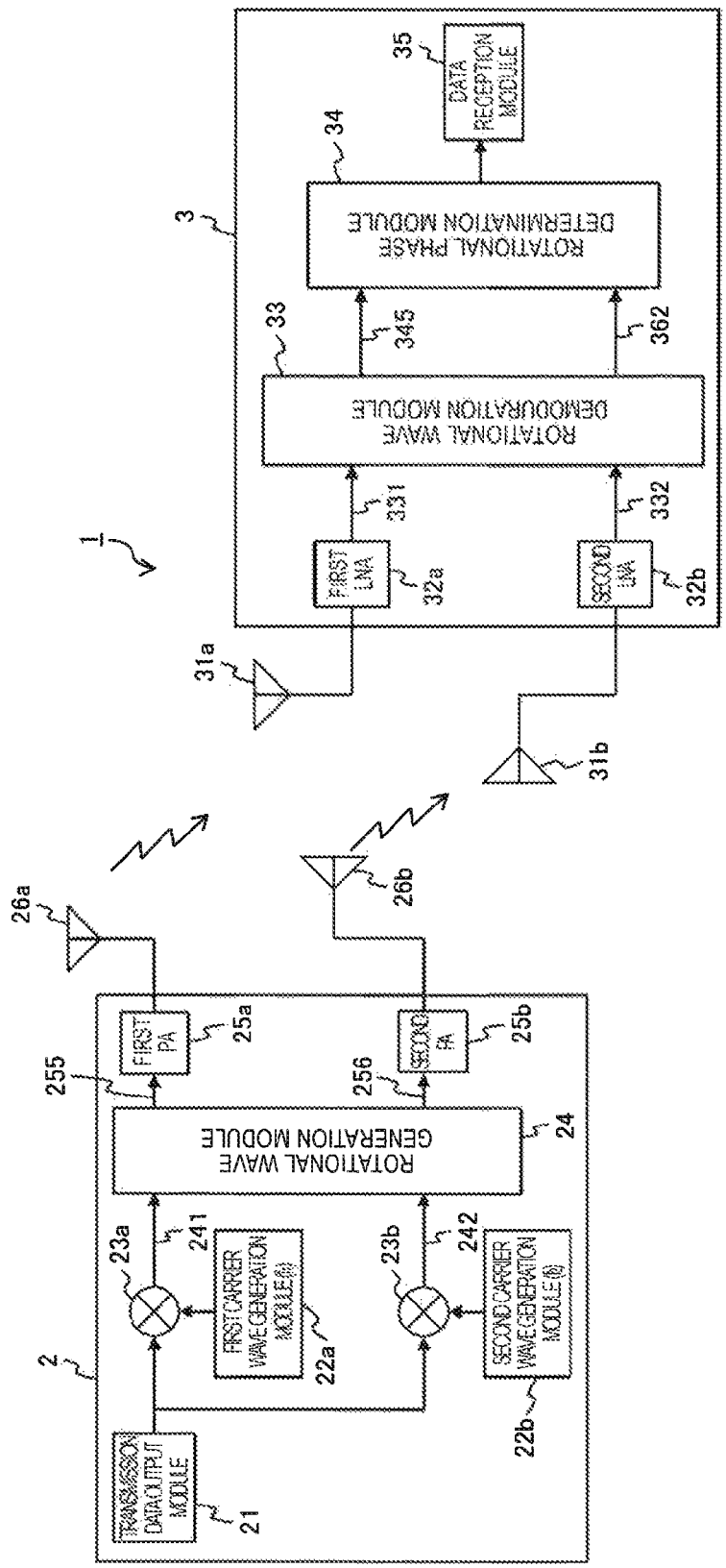
FIG. 1 is a schematic diagram illustrating a configuration of an entire wireless communication system according to an embodiment of the present invention.

In the present specification, among rotational waves, a rotational wave that rotates about a propagation axis clockwise when viewed from the transmitter side is referred to as a "right-hand circularly polarized wave", and a rotation that rotates about the propagation axis counterclockwise when viewed from the transmitter side is referred to as a "left-hand circularly polarized wave".

Embodiments of the present invention will be described referring to the drawings.

First Embodiment

FIG. 1 is a schematic diagram illustrating a configuration of an entire wireless communication system according to an embodiment of the present invention. A wireless communication system 1 is configured from a transmitter 2 and a receiver 3. The transmitter 2 has a transmission data output module 21, a first carrier wave generation module 22a, a second carrier wave generation module 22b, a first multiplier 23a, a second multiplier 23b, a rotational wave generation module 24, a first power amplifier (a first PA) 25a, a second power amplifier (a second PA) 25b, and a first transmission antenna 26a and a second transmission antenna 26b that are arranged mutually orthogonal to each other.

Furthermore, the receiver 3 has a first reception antenna 31a and a second reception antenna 31b that are arranged mutually orthogonal to each other, a first low noise amplifier (a first LNA) 32a, a second low noise amplifier (a second LNA) 32b, a rotational wave demodulation module 33, a rotational phase determination module 34, and a data reception module 35.

Figure 2:
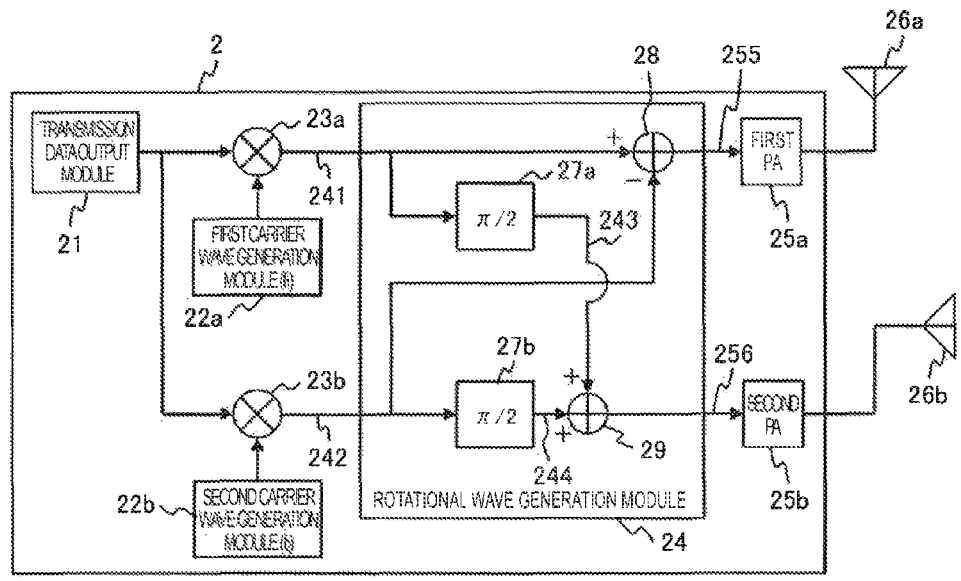
FIG. 2 is a diagram illustrating a configuration of a transmitter that is illustrated in FIG. 1, and is an explanatory diagram illustrating a circuit configuration of a rotational wave generation module.

Next, a specific configuration and operation of the transmitter 2 are described. FIG. 2 is a diagram illustrating the configuration of the transmitter 2 that is illustrated in FIG. 1, and an explanatory diagram illustrating a circuit configuration of the rotational wave generation module 24. The rotational wave generation module 24 is configured from a first delay unit 27a, a second delay unit 27b, a subtracter 28, and an adder 29.

First, transmission data is transmitted from the transmission data output module 21. The transmission data is transmitted as a digital signal that has either of two values "1" and −1". As one example, a case where the transmission data is "1" will be described below. The transmission data that is output from the transmission data output module 21 is branched into two pieces of transmission data. One piece of transmission data is input into the first multiplier 23a. Furthermore, the other piece of transmission data that results from the branching is input into the second multiplier 23b.

The first carrier wave generation module 22a outputs a first carrier wave signal that has a frequency $f_1$, to the first multiplier 23a. The first multiplier 23a performs phase shift keying (PSK) modulation by multiplying the first carrier wave signal by the transmission data "1" that is input. The signal 241 that goes through the PSK modulation is $\sin(2\pi f_1 t)$. Furthermore, the second carrier wave generation module 22b outputs a second carrier wave signal that has a frequency $f_2$, to the second multiplier 23b. At this point, the second multiplier 23b performs the PSK modulation by multiplying the second carrier signal by the transmission data "1" that is input. A signal 242 that goes through the PSK modulation is $\sin(2\pi f_2 t)$. At this point, the frequency $f_1$ of the first carrier wave signal and the frequency $f_2$ of the second carrier wave signal are different from each other.

In the rotational wave generation module 24, the signal 241 ($\sin(2\pi f_1 t)$) that is input from the first multiplier 23a is branched into two signals. One signal is input into the subtracter 28, and the other signal is input into the first delay unit 27a. Furthermore, the signal 242 ($\sin(2\pi f_2 t)$) that is input from the second multiplier 23b is branched into two signals. One signal is input into the subtracter 28, and the other signal is input into the second delay unit 27b. The subtracter 28 outputs a signal 255 that results from subtracting the signal 242 from the signal 241 that is input, to the first power amplifier (the first PA) 25a. At this point, the signal 255 is a value of x that is expressed in the following equation (1).

[Math. 1]

$$\chi = \sin(2\pi f_1 t) - \sin(2\pi f_2 t) \quad (1)$$
$$= 2\cos\left(2\pi \frac{f_1 + f_2}{2} t\right) \sin\left(\frac{f_1 - f_2}{2} t\right)$$

Furthermore, the adder 29 adds a signal 256, which results from adding up a signal 243 that results from the first delay unit 27a delaying (phase-shifting) the signal 241 by $\pi/2$ and a signal 244 that results from the second delay unit 27b delaying (phase-shifting) the signal 242 by $\pi/2$, to the second power amplifier 25b (the second PA) 25b. Moreover, the signal 243 that results from delaying the signal 241 by $\pi/2$ is $\cos(2\pi f_1 t)$, and the signal 244 that results from delaying the signal 242 by $\pi/2$ is $\cos(2\pi f_2 t)$. Furthermore, at this point, the signal 256 is a value of y that is expressed in the following equation (2).

[Math. 2]

$$y = \cos(2\pi f_1 t) + \cos(2\pi f_2 t) \quad (2)$$
$$= 2\cos\left(2\pi \frac{f_1 + f_2}{2} t\right) \cos\left(2\pi \frac{f_1 - f_2}{2} t\right)$$

The signal 255 is amplified by the first power amplifier (the first PA) 25a and is output from the first transmission antenna 26a. Furthermore, the signal 256 is amplified by the second power amplifier (the second PA) 25b and is output from the second transmission antenna 26b.

As described above, in the transmitter 2, the frequency $f_1$ of the first carrier wave and the frequency $f_2$ of the second carrier wave, which are generated by the first carrier wave generation module 22a and the second carrier wave generation module 22b, are different from each other. Therefore, a rotational frequency of the rotational wave that is output from the transmitter 2 is determined by a difference between the frequency $f_1$ of the first carrier wave and the frequency $f_2$ of the second carrier wave. The post-amplification signal 255 and the post-amplification signal 256 are radiated from the first transmission antenna 26a and the second transmission antenna 26b, respectively, in a state of being spatially orthogonal to each other, and thus an electric wave that is transmitted has a frequency $(f_1+f_2)/2$ and is a rotational wave that rotates at a rotational frequency $(|f_1-f_2|)/2$. At this point, in a case where $f_1 > f_2$, the rotational wave is the right-hand circularly polarized wave, and in a case where $f_1 < f_2$, the rotational wave is the left-hand circularly polarized wave. Moreover, a wave polarization scheme that is used according to the present embodiment is not limited to a circularly polarized wave or an elliptically polarized wave, and a target for the wave polarization is an electric wave that turns around the propagation axis according to a rotational frequency, or an electric wave that propagates while rotating. Therefore, no limitation to the specific polarization scheme described above is imposed.

Figure 3:
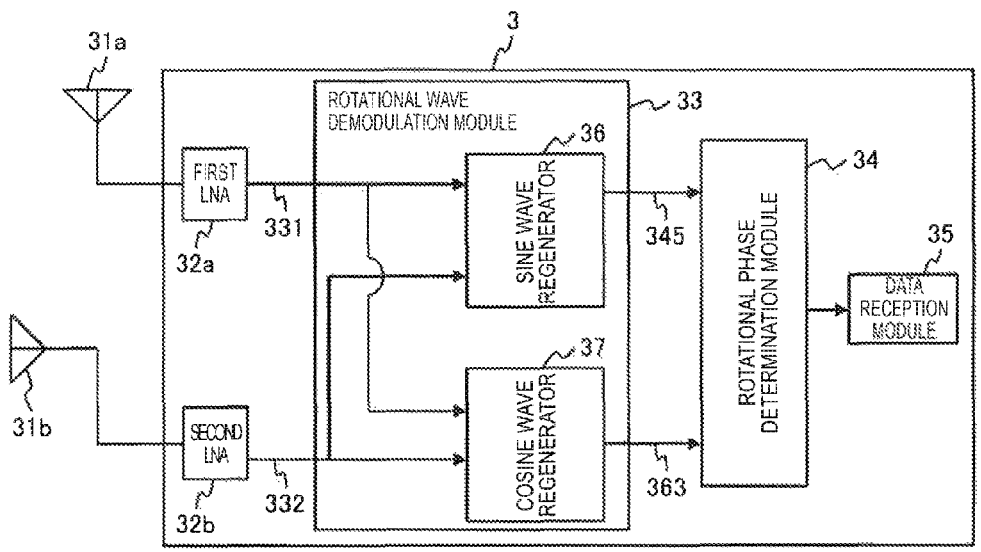
FIG. 3 is a diagram illustrating a configuration of a receiver that is illustrated in FIG. 1, and is an explanatory diagram illustrating a functional block of a rotational wave demodulation module.

Next, a specific configuration and operation of the receiver 3 are described. FIG. 3 is a diagram illustrating a configuration of the receiver that is illustrated in FIG. 1, and an explanatory diagram of a functional block of a rotational wave demodulation module. The rotational wave demodulation module 33 has a sine wave regenerator 36 and a cosine wave regenerator 37. Electric waves (rotational waves) that are received in the first reception antenna 31a and the second reception antenna 31b that are arranged mutually orthogonal to each other are the first low noise amplifier (the first LNA) 32a and the second low noise amplifier (the second LNA) 32b, respectively, for amplification. At this time, the first reception antenna 31a and the second reception antenna 31b, which are spatially orthogonal to each other, receive waves that are polarized toward the first reception antenna 31a and the second reception antenna 31b, respectively. The first reception antenna 31a and the second reception antenna 32b, which are arranged orthogonal to each other, can receive not only a horizontally polarized wave and a vertically polarized wave, respectively, but, can also receive an obliquely polarized wave at each rotational angle according to values of a vertical component and a horizontal component of the obliquely polarized wave. A signal 331 that is amplified by the first low noise amplifier (the first LNA) 32a is branched into two signals. One signal is input into the sine wave regenerator 36 that makes up the rotational wave demodulation module 33. Furthermore, the other one signal 331 that results from the branching is input into the cosine wave regenerator 37 that makes up the rotational wave demodulation module 33. A signal 332 that is amplified by the second low noise amplifier (the second LNA) 32b is branched into two signals. One signal is input into the sine wave regenerator 36. The other signal that results from branching the signal 332 is input into the cosine wave regenerator 37. The sine wave regenerator 36 outputs a signal 345 on which processing that will be described in detail below is performed, to the rotational phase determination module 34. Furthermore, the cosine wave regenerator 37 outputs a signal 362 on which processing which will be described in detail below is performed, to the rotational phase determination module 34. In the rotational phase determination module 34, reception data is read, and in the data reception module 35, data is acquired. In Equations (1) and (2), which are described above, a frequency $(f_1+f_2)/2$ of an electric wave that is transmitted, that is, a carrier wave frequency is hereinafter defined as f, and a rotational frequency $(|f_1-f_2|)/2$ is defined as g.

(1) Sine Wave Regenerator 36

Figure 4:
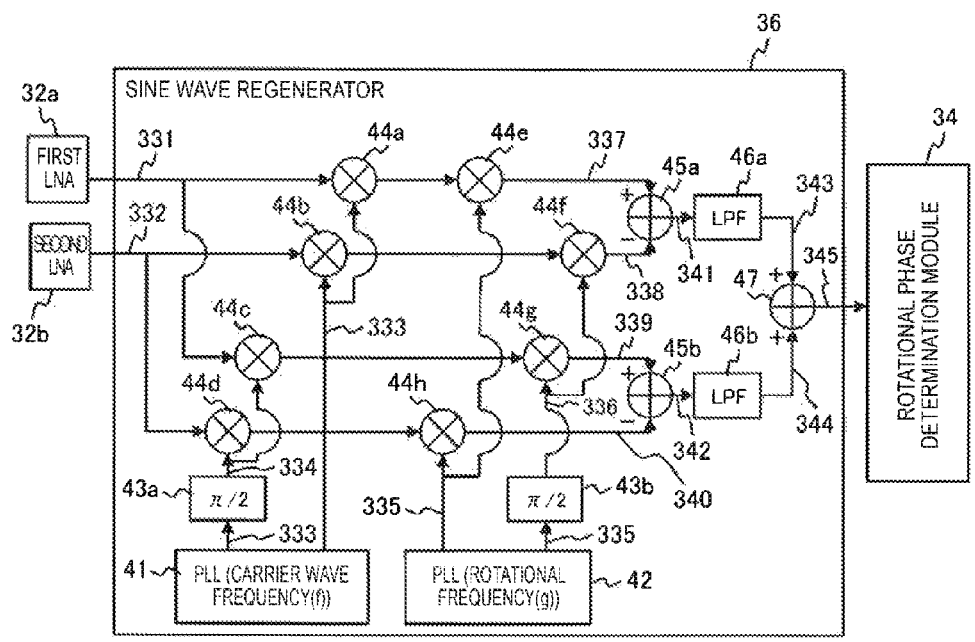
FIG. 4 is an explanatory diagram illustrating a circuit configuration of a sine wave regenerator that is illustrated in FIG. 3.

Next, a specific configuration and operation of the sine wave regenerator 36 are described. FIG. 4 is an explanatory diagram illustrating a circuit configuration of the sine wave regenerator 36 that is illustrated in FIG. 3. The sine wave regenerator 36 is configured from a phase locked loop (PLL) 41 for outputting a sine wave that has the carrier wave frequency f, a phase locked loop (PLL) 42 for outputting a sine wave that has a rotational frequency g, a first delay unit 43a, a second delay unit 43b, 8 multipliers 44a to 44h, a first subtracter 45a, a second subtracter 45b, a first low pass filter (LFP) 46a, a second low pass filter (LFP) 46b, and an adder 47. Moreover, the PLL 41 and the PLL 42 transmit periodic signals that serve as references that are set up by an oscillator that is not illustrated. Furthermore, it is not guaranteed that $\sin(2\pi ft)$ that is the signal 333 in the form of a sine wave, which is output from the PLL 41, is consistent, in phase, with the signal 331 that is input from the first low noise amplifier (the first LNA) 32a and the signal 332 that is input from the second low noise amplifier (the second LNA) 32b, that is, with the reception waves. Furthermore, in the same manner, it is not guaranteed that $\sin(2\pi gt)$ that is a signal 335 in the form of a sine wave, which is output from the PLL 42, is consistent, in phase, with the reception waves described above. Accordingly, a phase shift with respect to the carrier wave frequency is defined as $\alpha$, and a phase shift with respect to the rotational frequency is defined as $\beta$. At this point, $\alpha$ and $\beta$ are constants.

As illustrated in FIG. 4, in FIG. 3, each of the signal 331 and the signal 332 that are input, as the results of the branching, by the first low noise amplifier (the first LNA) 32a and the second low noise amplifier (the second LNA) 32b, respectively, is again branched within the sine wave regenerator 36.

At this point, the signal 331 is $2\cos(2\pi ft+\alpha)\sin(2\pi gt+\beta)$ and the signal 332 is $2\cos(2\pi ft+\alpha)\cos(2\pi gt+\beta)$.

The signal 331 is branched into two signals. One signal is input into the multiplier 44a, and the other signal is input into the multiplier 44c. Furthermore, the signal 332 is branched into two signals. One signal is input into the multiplier 44b, and the other signal is input into the multiplier 44d. The PLL 41 outputs $\sin(2\pi ft)$ that is the signal 333 in the form of a sine wave, which has the same frequency as a desired carrier wave frequency f which is set in advance, to each of the first delay unit 43a, the multiplier 44b, and the multiplier 44a. Furthermore, the PLL 42 outputs $\sin(2\pi gt)$ that is the signal 335 in the form of a sine wave, which has the same frequency as a desired rotational frequency g that is set in advance, to each of the second delay unit 43b, the multiplier 44e, and the multiplier 44h.

The multiplier 44a multiplies the signal 331 by the signal 333 in the form of a sine wave, and outputs a result of the multiplication to the multiplier 44e at the downstream side. The multiplier 44e multiplies an output from the multiplier 44a by the signal 335 in the form of a sine wave from the PLL 42, and outputs a signal 337 to the first subtracter 45a at the downstream side. At this point, the signal 337 is a value of $A_1$ as follows.

$$A_1 = 2\cos(2\pi ft + \alpha)\sin(2\pi gt + \beta) \times$$
$$2\sin(2\pi ft)\sin(2\pi gt)$$
$$= \{\sin(4\pi ft + \alpha) - \sin(\alpha)\} \times$$
$$\{\cos(4\pi gt + \beta) - \cos(\beta)\}$$

The multiplier 44b multiplies the signal. 332 by the signal 333 in the form of a sine wave, and outputs a result of the multiplication to a multiplier 44f at the downstream side. The multiplier 44f multiplies an output from the multiplier 44b by a signal 336 that results from the second delay unit 43b delaying (phase-shifting) the signal 335 from the PLL 42 by π/2, and outputs a signal 338 to the first subtracter 45a at the downstream side. At this point, the signal 336 is cos(2πgt) that is a signal in the form of a cosine wave, as a result of delaying by π/2 the signal 335 that is sin(2πgt). That is, the second delay unit 43b converts the sine wave into the cosine wave. Furthermore, the signal 338 that is input into the first subtracter 45a is a value of $B_1$ as follows.

$$B_1 = 2\cos(2\pi ft + \alpha)\cos(2\pi gt + \beta) \times$$
$$2\sin(2\pi ft)\cos(2\pi gt)$$
$$= \{\sin(4\pi ft + \alpha) - \sin(\alpha)\} \times$$
$$\{\cos(4\pi gt + \beta) + \cos(\beta)\}$$

The first subtracter 45a subtracts the signal 338 ($B_1$) from the signal 337 ($A_1$) that is input, and outputs a signal 341 ($A_1$-$B_1$) that results from the subtraction, to a first low pass filter 46a at the downstream side. At this point, the signal 341 ($A_1$-$B_1$) that is output from the first subtracter 45a is a value as follows.

$A_1-B_1=-2\cos(\beta)\{\sin(4\pi ft+\alpha)-\sin(\alpha)\}$

In this manner, the signal 341 that is output from the first subtracter 45a includes a time change component of sin (4πft+α).

The first low pass filter 46a performs band limitation on the signal 341 that is output from the first subtracter 45a which includes the time change component (a frequency component), according to a cutoff frequency that is set in advance. Setting of the cutoff frequency will be described below. A signal 343 that passes through the first low pass filter 46a is a value as follows.

$A_1-B_1\sim 2\sin(\alpha)\cos(\beta)=\sin(\alpha+\beta)+\sin(\alpha-\beta)$

In this manner, the signal 343 is a fixed value (a constant part) that results from cutting off the time change component (the frequency component).

Furthermore, the multiplier 44c multiplies the signal 331 by a signal 334 that results from the first delay unit 43a delaying (phase-shifting) the signal 333 from the PLL 41 by π/2, and outputs a result of the multiplication to a multiplier 44g at the downstream side. At this point, the signal 334 is cos(2πft) that is a signal in the form of a cosine wave, as a result of delaying by π/2 the signal 333 that is sin(2πft). That is, the first delay unit 43a converts the sine wave into the cosine wave. The multiplier 44g multiplies an output from the multiplier 44c by a signal 336 that results from the second delay unit 43b delaying (phase-shifting) the signal 335 from the PLL 42 by π/2, and outputs a signal 339 to the second subtracter 45b at the downstream side. At this point, the signal 336 is cos(2πgt) that is a signal in the form of a cosine wave. Furthermore, the signal 339 that is input into the second subtracter 45b is a value of $A_2$ as follows.

$$A_2 = 2\cos(2\pi ft + \alpha)\sin(2\pi gt + \beta) \times$$
$$2\cos(2\pi ft)\cos(2\pi gt)$$
$$= \{\sin(4\pi ft + \alpha) + \cos(\alpha)\} \times$$
$$\{\sin(4\pi gt + \beta) + \sin(\beta)\}$$

The multiplier 44d multiplies the signal 332 by the signal 334 that results from the first delay unit 43a delaying (phase-shifting) the signal 333 from the PLL 41 by π/2, and outputs a result of the multiplication to the multiplier 44h at the downstream side. At this point, the signal 334 is cos (2πft). The multiplier 44h multiplies an output from the multiplier 44d by the signal 335 in the form of a sine wave from the PLL 42, that is, by sin(2πgt), and outputs a signal 340 to the second subtracter 45b at the downstream side. At this point, the signal 340 is a value of $B_2$ as follows.

$$B_2 = 2\cos(2\pi ft + \alpha)\cos(2\pi gt + \beta) \times$$
$$2\cos(2\pi ft)\sin(2\pi gt)$$
$$= \{\cos(4\pi ft + \alpha) + \cos(\alpha)\} \times$$
$$\{\sin(4\pi gt + \beta) - \sin(\beta)\}$$

A second subtracter 46b subtracts the signal 340 ($B_2$) from the signal 339 ($A_2$) that is input, and outputs a signal 342 ($A_2$-$B_2$) that results from the subtraction, to a second low pass filter 46b at the downstream side. At this point, the signal 342 ($A_2$-$B_2$) that is output from the second subtracter 45b is a value as follows.

$A_2-B_2=2\sin(\beta)\{\cos(4\pi ft+\alpha)+\cos(\alpha)\}$

In this manner, the signal 342 that is output from the second subtracter 45b includes a time change component (a frequency component) of cos(4πft+α).

The second low pass filter 46b performs band limitation on the signal 342 that is output from the second subtracter 45b which includes the time change component (the frequency component), according to a cutoff frequency (details of which will be described below) that is set in advance. A signal 344 that passes through the second low pass filter 46b is a value as follows.

$A_2-B_2\sim 2\cos(\alpha)\sin(\beta)=\sin(\alpha+\beta)-\sin(\alpha-\beta)$

In this manner, the signal 343 is a fixed value (a constant part) that results from cutting off the time change component (the frequency component).

The adder 47 adds up the signal 343 and the signal 344, and outputs the signal 345 to the rotational phase determination module 34. At this point, the signal 345 is 2 sin(α+β).

Moreover, as expressed in 2 sin(2πft)sin(2πgt) in the signal 337($A_1$), 2 sin(2πft)cos(2πgt) in the signal 338($B_1$), 2 cos(2πft) cos(2πgt) in the signal 339($A_2$), and 2 cos(2πft) sin(2πgt) in the signal 340($B_2$), all of which are described above, the sine wave and the cos wave are set to be constant multiples for simplification of the equations. That is, the signal 331 that is input from the first low noise amplifier (the first LNA) 32a and the signal 332 that is input from the second low noise amplifier (the second LNA) 32b are multiplied by 2, but, particularly, this does not exert an influence on the nature of signal processing.

(2) Cosine Wave Regenerator 37

Figure 5:
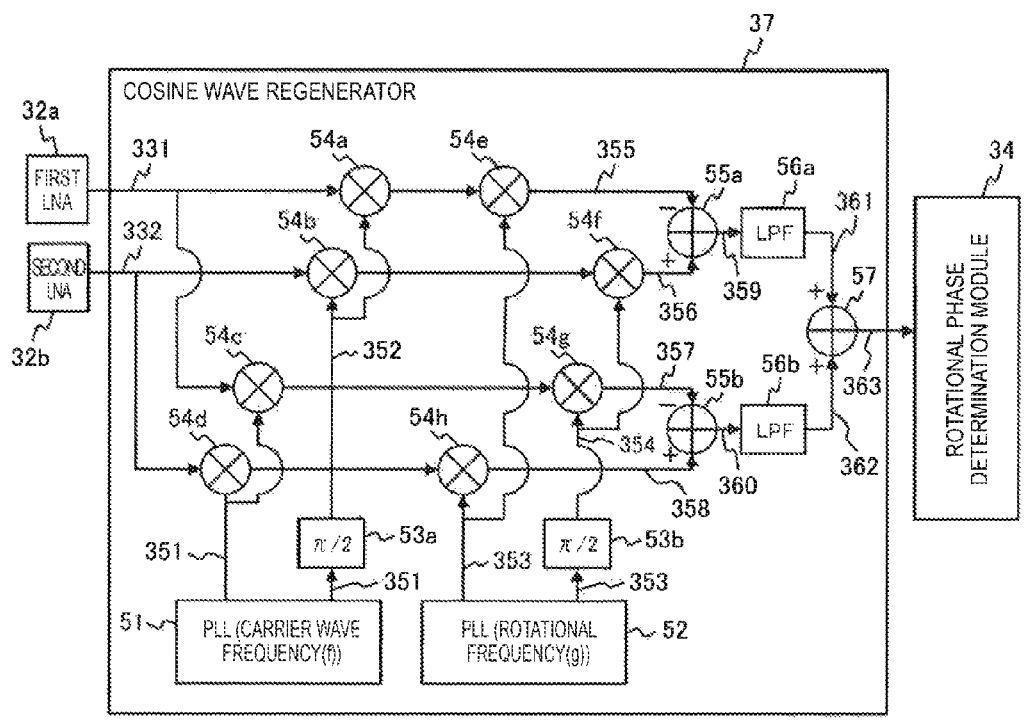
FIG. 5 is an explanatory diagram illustrating a circuit configuration of a cosine wave regenerator that is illustrated in FIG. 3.

Next, a specific configuration and operation of the cosine wave regenerator 37 are described. FIG. 5 is an explanatory diagram illustrating a circuit configuration of the cosine wave regenerator 37 that is illustrated in FIG. 3. The cosine wave regenerator 37 is configured from a phase locked loop (PLL) 51 that has the carrier frequency f, a phase locked loop (PLL) 52 for outputting a sine wave that has the rotational frequency g, a first delay unit 53a, a second delay unit 53b, 8 multipliers 54a to 54h, a first subtracter 55a, a second subtracter 55b, a first low pass filter 56a, a second low pass filter 56b, and an adder 57. Moreover, the PLL 51 and the PLL 52 receive periodic signals that serve as references that are set up by an oscillator that is not illustrated. Furthermore, as is the case with the sine wave regenerator 36 described above, it is not guaranteed that sin(2πft) that is the signal 351 in the form of a sine wave, which is output from PLL 51, and the signal 331 that is input from the first low noise amplifier (the first LNA) 32a and the signal 332 that is input from the second low noise amplifier (the second LNA) 32b, that is, the reception waves, are consistent with one another. Furthermore, because it is not guaranteed in the same manner that sin(2πgt) that is the signal 353 in the form of a sine wave, which is output from the PLL 52, and the reception waves described above are consistent, in phase, with one another, a phase shift with respect to the carrier frequency is defined as α, and a phase shift with respect to the rotational frequency is defined as β. At this point, α and β are constants.

As illustrated in FIG. 5, in FIG. 3, each of the signal 331 and the signal 332 that are input, as the results of the branching, by the first low noise amplifier (the first LNA) 32a and the second low noise amplifier (the second LNA) 32b, respectively, is again branched within the cosine wave regenerator 37. At this point, the signal 331 is 2 cos(2πft+α)sin(2πgt+β) and the signal 332 is 2 cos(2πft+α)cos(2πgt+β).

The signal 331 is branched into two signals. One signal is input into the multiplier 54a, and the other signal is input into the multiplier 54c. Furthermore, the signal 332 is branched into two signals. One signal is input into the multiplier 54b, and the other signal is input into the multiplier 54d. The PLL 51 outputs sin(2πft) that is the signal 351 in the form of a sine wave, which has the same frequency as a desired carrier wave frequency f which is possible to arbitrarily set, to each of the first delay unit 53a, the multiplier 54c, and the multiplier 54d. Furthermore, the PLL 52 outputs sin(2πgt) that is the signal 353 in the form of a sine wave, which has the same frequency as a desired rotational frequency g that is possible to arbitrarily set, to each of the second delay unit 53b, the multiplier 54e, and the multiplier 54h.

The multiplier 54a multiplies the signal 331 by a signal 352 (cos(2πft)) that results from the first delay unit 53a delaying (phase-shifting) the signal 351 from the PLL 51 by π/2, and outputs a result of the multiplication to the multiplier 54e at the downstream side. The multiplier 54e multiplies an output from the multiplier 54a by the signal 353 in the form of a sine wave from the PLL 52, and outputs a signal 355 to the first subtracter 55a at the downstream side. At this point, the signal 355 is a value of $A_3$ as follows.

$$A_3 = 2\cos(2\pi ft + \alpha)\sin(2\pi gt + \beta) \times$$
$$2\cos(2\pi ft)\sin(2\pi gt)$$
$$= \{\cos(4\pi ft + \alpha) - \cos(\alpha)\} \times$$
$$\{\cos(4\pi gt + \beta) - \cos(\beta)\}$$

The multiplier 54b multiplies the signal 332 by the signal 352 (cos(2πft)) that results from the first delay unit 53a delaying (phase-shifting) the signal 351 from the PLL 51 by π/2, and outputs a result of the multiplication to the multiplier 54f at the downstream side. The multiplier 54f multiplies an output from the multiplier 54b by a signal 354 (cos(2πgt)) that results from the second delay unit 53b delaying (phase-shifting) the signal 353 from the PLL 52 by π/2, and outputs a signal 356 to the first subtracter 55a at the downstream side. At this point, the signal 356 is a value of $B_3$ as follows.

$$B_3 = 2\cos(2\pi ft + \alpha)\cos(2\pi gt + \beta) \times$$
$$2\cos(2\pi ft)\cos(2\pi gt)$$
$$= \{\cos(4\pi ft + \alpha) + \cos(\alpha)\} \times$$
$$\{\cos(4\pi gt + \beta) + \cos(\beta)\}$$

The first subtracter 55a subtracts the signal 355 ($A_3$) from the signal 356 ($B_3$) that is input, and outputs a signal 359 ($B_3$-$A_3$) that results from the subtraction, to the first low pass filter 56a at the downstream side. At this point, the signal 359 ($B_3$-$A_3$) that is output from the first subtracter 55a is a value as follows.

$$B_3 - A_3 = 2\cos(\beta)\{\cos(4\pi ft + \alpha) + \cos(\alpha)\}$$

In this manner, the signal 359 that is output from the first subtracter 55a includes the time change component (the frequency component) of cos(4πft+α).

The first low pass filter 56a performs the band limitation on the signal 359 that is output from the first subtracter 55a which includes the time change component (the frequency component), according to the cutoff frequency that is set in advance. A signal 361 that passes through the first low pass filter 56a is a value as follows.

$$B_3 - A_3 \sim 2\cos(\alpha)\cos(\beta) = \cos(\alpha+\beta) + \cos(\alpha-\beta)$$

In this manner, the signal 361 is a fixed value (a constant part) that results from cutting off the time change component (the frequency component).

Furthermore, the multiplier 54c multiplies the signal 331 by the signal 351 (sin(2πft)) in the form of a sine wave from the PLL 51, and outputs a result of the multiplication to the multiplier 54g at the downstream side. The multiplier 54g multiplies an output from the multiplier 54c by the signal 354 (cos(2πgt)) that results from the second delay unit 53b delaying (phase-shifting) the signal 353 from the PLL 52 by π/2, and outputs a signal 357 to the second subtracter 55b at the downstream side. At this point, the signal 357 is a value of $A_4$ as follows.

$$A_4 = 2\cos(2\pi ft + \alpha)\sin(2\pi gt + \beta) \times$$
$$2\sin(2\pi ft)\cos(2\pi gt)$$

$$= \{\cos(4\pi ft + \alpha) - \sin(\alpha)\} \times$$
$$\{\cos(4\pi gt + \beta) - \cos(\beta)\}$$

The multiplier 54d multiplies the signal 332 by the signal 351 (sin(2πft)) from the PLL 51, and outputs a result of the multiplication to the multiplier 54h at the downstream side. The multiplier 54h multiplies an output from the multiplier 54d by the signal 353 (sin(2πgt)) from the PLL 52, and outputs a signal 358 to the second subtracter 55b at the downstream side. At this point, the signal 358 is a value of $B_4$ as follows.

$$B_4 = 2\cos(2\pi ft + \alpha)\cos(2\pi gt + \beta) \times$$
$$2\sin(2\pi ft)\sin(2\pi gt)$$
$$= \{\sin(4\pi ft + \alpha) - \sin(\alpha)\} \times$$
$$\{\cos(4\pi gt + \beta) + \cos(\beta)\}$$

The second subtracter 55b subtracts the signal 357 ($A_4$) from the signal 358 ($B_4$) that is input, and outputs a signal 360 ($B_4$–$A_4$) that results from the subtraction, to the second low pass filter 56b at the downstream side. At this point, the signal 360 ($B_4$–$A_4$) that is output from the second subtracter 55b is a value as follows.

$$B_4-A_4=2\sin(\beta)\{\sin(4\pi ft+\alpha)-\sin(\alpha)\}$$

In this manner, the signal 360 that is output from the second subtracter 55b includes a time change component (a frequency component) of cos(4πgt+β).

The second low pass filter 56b performs the band limitation on the signal 360 that is output from the second subtracter 55b which includes the time change component (the frequency component), according to the cutoff frequency that is set in advance. The signal 362 that passes through the second low pass filter 56b is a value as follows.

$$B_4-A_4 \sim 2\sin(\alpha)\sin(\beta)=\cos(\alpha+\beta)-\cos(\alpha-\beta)$$

In this manner, the signal 362 is a fixed value (a constant part) that results from cutting off the time change component (the frequency component).

The adder 57 adds up the signal 361 and the signal 362, and outputs the signal 363 to the rotational phase determination module 34. At this point, the signal 363 is 2 cos(α+β).

Moreover, as is the case with the sine wave regenerator 36 described above, as expressed in 2 cos(2πft) sin(2πgt) in the signal 355($A_3$), 2 cos(2πft)cos(2πgt) in the signal 356($B_3$), 2 sin(2πft) cos(2πgt) in the signal 357($A_4$), and 2 sin(2πft) sin(2πgt) in the signal 358($B_4$), all of which are described above, the sine wave and the cos wave are set to be constant multiples for simplification of the equations. That is, the signal 331 that is input from the first low noise amplifier (the first LNA) 32a and the signal 332 that is input from the second low noise amplifier (the second LNA) 32b are multiplied by 2, but, particularly, this does not exert an influence on the nature of signal processing.

Next, the rotational phase determination module 34 is described. As illustrated in FIGS. 3 to 5, the signal 345 (2 sin(α+β)) from the sine wave regenerator 36 that makes up the rotational wave demodulation module 33, and the signal 363 (2 cos(α+β)) from the cosine wave regenerator 37 are input into the rotational phase determination module 34. Based on the signal 345 and the signal 363 that are input into these, the rotational phase determination module 34 performs phase determination. The rotational wave demodulation module 33 is described above, for example, using a case where the transmission data that is output from the transmission data output module 21 which is illustrated in FIG. 2 is "1".

In the rotational phase determination module 34, for example, in a case where the transmission data is "1" and α+β is "0", cos(α+β) is "1". Furthermore, in a case where the transmission data is "−1", a reception signal (a reception wave) itself is multiplied by −1, and in a case where α+β is "0", cos(α+β) is "−1". However, in a case where α+β is "π/2", cos(α+β) is "0", without depending on whatever the transmission data is. Furthermore, in a case where α+β is "π", a value of cos(α+β) and the transmission data are inverted with respect to each other, without depending on whatever the transmission data is.

Figure 6:
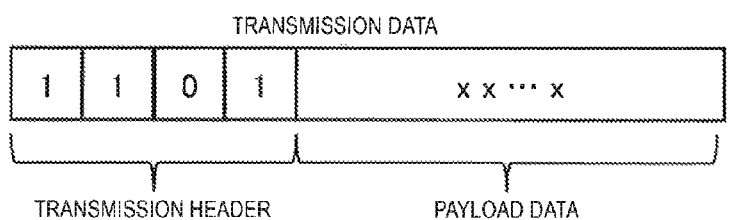
FIG. 6 is a diagram illustrating a frame of transmission data that is transmitted and received in the wireless communication system that is illustrated in FIG. 1.

Accordingly, a frame of the transmission data is used that is transmitted and received by the wireless communication system 1 which is illustrated in FIG. 6. As illustrated in FIG. 6, the frame (a transmission data format) of the transmission data is configured from a transmission header and payload data. The transmission header is shared by the transmitter 2 and the receiver 3 that make up the wireless communication system 1, and is used for phase determination. For example, in a case where α+β is "π/2", because, for reception data of a transmission header portion, cos(α+β) is "0", "0", "0", and "0" and sin (α+β) is "1", "1", "0", and "1", it can be determined that α+β is "π/2" and it is possible to receive data correctly. Resolution of α+β depends on resolution of the reception data, but if resolution of minimum "π" is present, the reception of data is possible. Furthermore, in FIG. 6, as one example, a case where the transmission header is set to be 4 bits long is illustrated as an example, but no limitation to this is imposed. If the transmission header is asymmetrical with respect to the inversion of the data, this does not matter. For example, the transmission header may be two bits, one byte, or the like long.

The basic operation of the wireless communication system 1 according to the present embodiment is described above. Among electric waves each of which has multiple rotational frequencies, an operation of selectively demodulating an electric wave that has a desired rotational frequency will be described below.

A case is assumed in which an electric wave that has the same carrier wave frequency f as that of the desired carrier wave and that has a rotational frequency g' different from a desired rotational frequency g is input into the receiver 3 that is illustrated in FIG. 3. In this case, in the sine wave regenerator 36 that is illustrated in FIG. 4, each of the signal 331 and the signal 332 that are input, as the results of the branching, by the first low noise amplifier (the first LNA) 32a and the second low noise amplifier (the second LNA) 32b, respectively, is again branched within the sine wave regenerator 36, as described above.

At this point, the signal 331 is 2 cos(2πft+α)sin(2πg't+β) and the signal 332 is 2 cos(2πft+α)cos(2πg't+β). The multiplier 44a multiplies the signal 331 by the signal 333 (sin(2πft)) in the form of a sine wave, which has the same frequency as the carrier wave frequency f from the PLL 41, and outputs the multiplier 44e at the downstream side. The multiplier 44e multiplies the output from the multiplier 44a by the signal 335 (sin(2πgt)) in the form of a sine wave, which has the same frequency as a desired rotational frequency g from the PLL 42, and outputs the signal 337 at the first subtracter 45a at the downstream side. At this point, the signal 337 is a value of A as follows.

$$A = 2\cos(2\pi ft + \alpha)\sin(2\pi g't + \beta) \times$$
$$2\sin(2\pi ft)\sin(2\pi gt)$$
$$= \{\sin(4\pi ft + \alpha) - \sin(\alpha)\} \times$$
$$\{\cos(2\pi(g+g')t + \beta) - \cos(2\pi(g-g') + \beta)\}.$$

The multiplier 44b multiplies the signal 332 by the signal 333 (sin 2πft)) in the form of a sine wave, and outputs a result of the multiplication to the multiplier 44f at the downstream side. The multiplier 44f multiplies the output from the multiplier 44b by the signal 336 (cos(2πgt)) that results from the second delay unit 43b delaying (phase-shifting) the signal 335 from the PLL 42 by π/2, and outputs the signal 338 to the first subtracter 45a at the downstream side. Furthermore, the signal 338 that is input into the first subtracter 45a is a value of B as follows.

$$B = 2\cos(2\pi ft + \alpha)\cos(2\pi g't + \beta) \times$$
$$2\sin(2\pi ft)\cos(2\pi gt)$$
$$= \{\sin(4\pi ft + \alpha) - \sin(\alpha)\} \times$$
$$\{\cos(2\pi(g=g')t + \beta) + \cos(2\pi(g-g') + \beta)\}$$

The first subtracter 45a subtracts the signal 338 (B) from the signal 337 ($A_1$) that is input, and outputs the signal 341 (A−B) that results from the subtraction, to the first low pass filter 46a at the downstream side. At this point, the signal 341 that is output from the first subtracter 45a is a value as follows.

$$A-B = -2\cos(2\pi(g-g')t+\beta) \times \{\sin(4\pi ft+\alpha) - \sin(\alpha)\}$$

In this manner, the signal 341 that is output from the first subtracter 45a includes the time change component (the frequency component). Accordingly, when the cutoff frequency that is set in advance in the first low pass filter 46a is set to be smaller than g-g', a signal that is output from the first low pass filter 46a is "0". Moreover, the same is true for the second low pass filter 46b that is illustrated in FIG. 4, and the first low pass filter 56a and the second low pass filter 56b that make up the cosine wave regenerator 37 which is illustrated in FIG. 5. Therefore, in a case where an electric wave has a rotational frequency g' other than a desired frequency, which, at this point, is the rotational frequency g, outputs of the first low pass filter 46a and the second low pass filter 46b that make up the sine wave regenerator 36, and outputs of the first low pass filter 56a and the second low pass filter 56b that make up the cosine wave regenerator 37 are all "0".

With regard to the cutoff frequencies of the low pass filters (46a, 46b, 56a, and 56b) that enable a desired rotational frequency g to be selected, even in a case where a rotational frequency g' different from the desired rotational frequency g is individually received in the receiver 3, or in a case where the rotational frequency g' is received in the receiver 3 in a state of being superimposed on the desired rotational frequency g, it is possible to cut off the rotational frequency g' that includes the time change component (the frequency component) by setting the cutoff frequency to a value smaller than g-g' according to performance (characteristics) of the low pass filter to be used. Therefore, only the desired rotational frequency g can be obtained. If the cut-off frequency is set to a value greater than g-g', a component of the rotational frequency g' is included in a rotational wave that passes through the low pass filter. However, if a low pass filter is used that has a characteristic that a difference between a desired rotational frequency g and a different rotational frequency g' is possible to identify, it is possible to identify a desired rotational frequency g with higher precision. On the other hand, a type of rotational frequency that is available within the same frequency band is said to depend on the cutoff frequency that is set in the low pass filter.

As described above, according to the present embodiment, the wireless communication system can be provided that enables many more wireless communication devices to perform concurrent communication using a polarized wave technology. Furthermore, for example, multiple wireless devices are enabled to perform the concurrent communication at the same frequency at the same time.

Furthermore, among electric waves that have the same carrier wave frequencies and different rotational frequencies, it is possible to identify and receive an electric wave that has a desired rotational frequency. Accordingly, when compared with a wireless communication scheme in the related art in which a frequency band is divided and thus the number of channels is increased, each frequency band can be further divided by the rotational frequency for communication, the number of channels can be rapidly increased, and it is possible to realize multi-dimensional connection communication.

Second Embodiment

Figure 7:
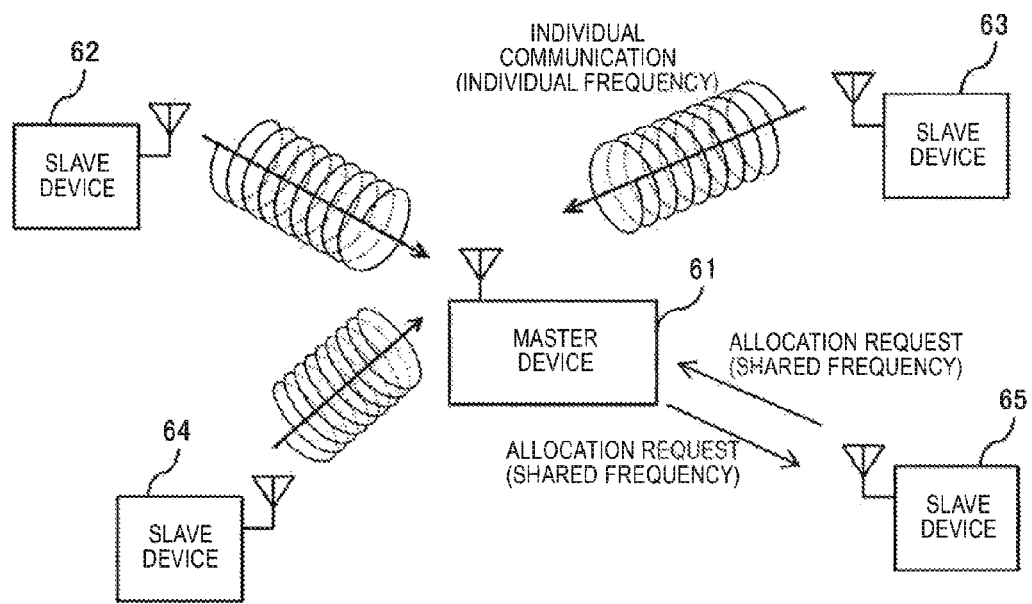
FIG. 7 is a schematic diagram illustrating a configuration of an entire wireless communication system according to another embodiment of the present invention.

FIG. 7 is a schematic diagram illustrating a configuration of an entire wireless communication system according to another embodiment of the present invention, which is a second embodiment. According to the first embodiment described above, the configuration is employed in which the rotational frequency to use is allocated in advance to the transmitter and the receiver for common use, and in which the receiver identifies and receives the rotational wave (the electric wave) that has a desired rotational frequency (a rotational frequency that is allocated in advance), from rotational waves that are to be received. In contrast, the present embodiment is different from the first embodiment in that a configuration in which individual rotational frequencies are dynamically allocated is employed.

As illustrated in FIG. 7, the wireless communication system according to the present embodiment is configured from a master device 61 and multiple slave devices 62 to 65. In FIG. 7, for simplification, each of the master device 61 and the slave devices 62 to 65 is illustrated as having one antenna, but has two antennas that, as is the case with the first embodiment, are arranged mutually orthogonal to each other. Furthermore, each of the master device 61 and the slave devices 62 to 65 has both the transmitter 2 and the receiver 3 that are illustrated in the first embodiment, and function as a transmission and reception device (which is hereinafter referred to as a "wireless device").

The master device 61 allocates a frequency to each of the slave devices 62 to 65. At this time, all wireless devices have a shared rotational frequency (which is hereinafter referred to as a shared frequency), and the shared frequency is used only for frequency allocation. For example, in a case where the slave device 65 starts to perform communication, first, the slave device 65 transmits a "frequency allocation request" to the master device 61, using the shared frequency. When the master device 61 receives the "frequency allocation request", the master device 61 transmits an "allocation response" to the slave device 65, using the shared frequency, and allocates a frequency. The slave 65 receives the "allocation response" that is transmitted from the master device 61, and starts to perform individual communication using a rotational frequency (a rotational frequency that is allocated) that is included in the "allocation response".

At this point, in a case where, among the slave devices 62 to 64, "allocation requests" are transmitted at the same time from at least one or more slave devices to the master device 61, in a case where the master device 61 is in a state of performing the communication with the other slave devices 62 to 64, and so forth, a case can occur in which the "allocation response" is not transmitted from the master device 61. In this case, the slave device 65 waits for a random time, and then again transmits the allocation request to the master device 61 (retry).

Furthermore, when the slave device 65 receives the "allocation response" from the master device 61, starts to perform the individual communication using the rotational frequency (the rotational frequency that is allocated) that is included in the "allocation response", and ends that individual communication, the slave device 65 transmits a "release request" to the master device 61, and releases the frequency. Accordingly, a state is attained in which it is possible for the master device 61 to allocate the rotational frequency that has been allocated so far to the slave device 65 to any one of the other slave devices 62 and 64.

Moreover, according to the present embodiment, as is the case with the first embodiment, each of the master device 61 and the slave devices 62 to 65 is configured to include two antennas that are arranged mutually orthogonal to each other and both the transmitter 2 and the receiver 3, but no limitation to this is imposed. For example, a simpler circuit configuration may be employed in which the phase locked loop (PLL) that has a function of frequency synthesizer is included.

As described above, according to the present embodiment, in addition to the effect that is obtained by the first embodiment, the dynamic allocation of the rotational frequency is possible, and it is possible to use many wireless devices in the same frequency band.

Third Embodiment

According to the second embodiment, as illustrated in FIG. 7, the master device 61 is configured to transmit the "allocation response" to the slave device according to the reception of the "frequency allocation requests" from the slave devices 62 to 65 and thus to allocate the rotational frequency dynamically. In contrast, the present embodiment is different from the second embodiment in that a configuration in which time division communication is performed between the master device 61 that is illustrated in FIG. 7 and each of the multiple slave devices 62 to 65 is employed.

The wireless communication system that is illustrated in FIG. 7, is made up of four slave devices. However, as described below, a frame (a transmission data format) of the transmission data that is transmitted and received between wireless communication systems is configured from multiple time slots that result from division, and thus it is possible to establish as many communication paths (communication channels) as the time slots with one-time transmission and reception.

For example, in a case where the number of slots that are included in the frame of the transmission data is set to 8, and 20 rotational frequencies are prepared as rotational frequencies that are mutually different frequencies, the number of wireless devices that are available for the concurrent communication is 160. That is, the number of communication paths (the number of communication channels) that are established at the same time is 160. At this point, each wireless device is assumed to be configured as a transmission and reception device that includes both the transmitter 2 and the receiver 3 that are described according to the first embodiment.

According to the present embodiment, each wireless device can identify whether or not the reception data (the rotational wave) that is received corresponds to a desired rotational frequency, and the frame of the transmission data is configured from multiple time slots. Thus, in addition to the effect that is obtained by the second embodiment, it is possible to increase the number of wireless devices that are available for the concurrent communication.

Fourth Embodiment

According to the second embodiment, as illustrated in FIG. 7, the master device 61 is configured to transmit the "allocation response" to the slave device according to the reception of the "frequency allocation requests" from the slave devices 62 to 65 and thus to allocate the rotational frequency dynamically. In contrast, the present embodiment is different from the second embodiment in that a frequency division communication scheme is introduced in the configuration of the second embodiment. According to the present embodiment, the master device and the slave device that make up the wireless communication system are assumed to be configured as the transmission and reception device (the wireless device) that has both the transmitter 2 and the receiver 3 that are described according to the first embodiment.

As described according to the first embodiment, in order to generate the rotational wave, two frequencies, that is, a first carrier wave frequency ($f_1$) and a second carrier wave frequency ($f_2$) are necessary. A case where a 426 MHz band and a 429 MHz band are used as the first carrier wave frequency ($f_1$) and the second carrier wave frequency ($f_2$), respectively, will be described below as an example.

The 426 MHz band that is a band of the first carrier wave frequency ($f_1$) is enabled to be frequency-divided into 10 channels in units of 12.5 kHz, and thus to be available. Furthermore, the 429 MHz band that is a band of the second carrier wave frequency ($f_2$) is enabled to be frequency-divided into 46 channels in units of 12.5 KHz, and thus 46 channels are enabled to be available. In this case, a frequency of the rotational wave to transmit, as described according to the first embodiment, is determined by an average $((f_1+f_2)/2)$ of two frequencies, and the rotational frequency is determined by a difference $((|f_1-f_2|)/2)$ between two frequencies. Therefore, in this case, the number of available combinations of frequencies is 460. That is, it is possible to generate 460 rotational waves that have mutually different rotational frequencies.

The need for two frequency bands for generation of the rotational frequency is a demerit of rotational wave generation. However, the removal of the demerit in terms of the number of channels is possible with the combination with frequency division multiplex.

According to the present embodiment, each of the first carrier wave frequency ($f_1$) and the second carrier wave frequency ($f_2$) that is used for the generation of rotational wave is frequency-divided in units of given frequencies. Thus, it is possible to increase the number of rotational waves that have mutual different rotational frequencies, when compared with the second embodiment.

Moreover, the present invention is not limited to the embodiments described above, and includes various modification examples. For example, the embodiments described above are described in detail in order to provide an easy description of the present invention, and the present invention is not necessarily limited to including all the configurations as described above. Furthermore, it is possible to replace one part of a configuration of a certain embodiment with a configuration of a different embodiment, and it is possible to add the configuration of the different embodiment to the configuration of the certain embodiment. Furthermore, it is possible to add, delete, or replace the configuration of the different embodiment to, from, and with one part of the configuration of each embodiment.

REFERENCE SIGNS LIST

1 WIRELESS COMMUNICATION SYSTEM
2 TRANSMITTER
3 RECEIVER
21 TRANSMISSION DATA OUTPUT MODULE
22a FIRST CARRIER WAVE GENERATION MODULE
22b SECOND CARRIER WAVE GENERATION MODULE
23a FIRST MULTIPLIER
23b SECOND MULTIPLIER
24 ROTATIONAL WAVE GENERATION MODULE
25a FIRST POWER AMPLIFIER (FIRST PA)
25b SECOND POWER AMPLIFIER (SECOND PA)
26a FIRST TRANSMISSION ANTENNA
26b SECOND TRANSMISSION ANTENNA
27a FIRST DELAY UNIT
27b SECOND DELAY UNIT
28 SUBTRACTER
29, 47, 57 ADDER
31a FIRST RECEPTION ANTENNA
31b SECOND RECEPTION ANTENNA
32a FIRST LOW NOISE AMPLIFIER (FIRST LNA)
32b SECOND LOW NOISE AMPLIFIER (SECOND LNA)
33 ROTATIONAL WAVE DEMODULATION MODULE
34 ROTATIONAL PHASE DETERMINATION MODULE
35 DATA RECEPTION MODULE
36 SINE WAVE REGENERATOR
37 COSINE WAVE REGENERATOR
41, 42, 51, 52 PHASE LOCKED LOOP (PLL)
43a, 53a FIRST DELAY UNIT
43b, 53b SECOND DELAY UNIT
44a TO 44h, 54a TO 54h MULTIPLIER
45a, 55a FIRST SUBTRACTER
45b, 55b SECOND SUBTRACTER
46a, 56a FIRST LOW PASS FILTER
46b, 56b SECOND LOW PASS FILTER
61 MASTER DEVICE
62 TO 95 SLAVE DEVICE
241 TO 244, 255, 256, 331 TO 345, 351 TO 363 SIGNAL

The invention claimed is:
1. A wireless communication system comprising:
a carrier wave generation module that generates a first carrier wave and a second carrier wave that have mutually different frequencies;
a transmitter that has a rotational wave generation module which generates a rotational wave based on the first and second carrier waves;
a rotational wave demodulation module that, for the rotational wave that is received, selectively demodulates an electric wave which has a desired rotational frequency, based on a result of multiplying a sine wave that has the same frequency as a frequency of a desired carrier wave and a sine wave that has the same frequency as the desired rotational frequency; and
a receiver that has a rotational phase determination module which determines a phase shift of the received rotational wave from an output of the rotational wave demodulation module.

2. The wireless communication system according to claim 1,
wherein the rotational wave demodulation module includes a sine wave regenerator that includes
a first carrier wave frequency generation module which generates a sine wave which has the same frequency as a frequency of the desired carrier wave, and
a first rotational frequency generation module which generates a sine wave which has the same frequency as the desired rotational frequency, and
wherein the sine wave regenerator generates a sine wave corresponding to the received rotational wave, based on at least the result of multiplying the sine wave from the first carrier wave frequency generation module and the received rotational wave and a result of multiplying the sine wave from the first rotational frequency generation module and the received rotational wave.

3. The wireless communication system according to claim 2,
wherein the rotational wave demodulation module includes a cosine wave regenerator that includes
a second carrier wave frequency generation module which generates a sine wave which has the same frequency as a frequency of the desired carrier wave, and
a second rotational frequency generation module which generates a sine wave which has the same frequency as the desired rotational frequency, and
wherein the cosine wave regenerator that generates a cosine wave corresponding to the received rotational wave, based on at least the result of multiplying the sine wave from the second carrier wave frequency generation module and the received rotational wave and a result of multiplying the sine wave from the second rotational frequency generation module and the received rotational wave.

4. The wireless communication system according to claim 2,
wherein the sine wave regenerator has a filter that enables a frequency component that is equivalent to the desired rotational frequency to pass through, from a signal that is based on a result of multiplying a superimposition rotational wave that results from superimposing a different rotational frequency on the desired rotational frequency, which is received, and the sine wave from the first carrier wave frequency generation module, and from a signal that is based on a result of multiplying the superimposition rotational wave and the sine wave from the first rotational wave generation module.

5. The wireless communication system according to claim 3,
wherein the cosine wave regenerator has a filter that enables a frequency component that is equivalent to the desired rotational frequency to pass through, from a signal that is based on a result of multiplying a superimposition rotational wave that results from superimposing a different rotational frequency on the desired rotational frequency, which is received, and the sine wave from the second carrier wave frequency generation module, and from a signal that is based on a result of multiplying the superimposition rotational wave and the sine wave from the second rotational wave generation module.

6. The wireless communication system according to claim 4,
wherein the receiver includes two low noise amplifiers, and
wherein the sine wave regenerator includes
   a multiplier that multiplies the rotational wave that is input through the low noise amplifier and the sine wave from the first carrier wave frequency generation module, and
   a multiplier that multiplies the rotational wave that is input through the low noise amplifier and the sine wave from the first rotational frequency generation module.

7. The wireless communication system according to claim 5,
wherein the receiver includes two low noise amplifiers, and
wherein the cosine wave regenerator includes
   a multiplier that multiplies the rotational wave that is input through the low noise amplifier and the sine wave from the second carrier wave frequency generation module, and
   a multiplier that multiplies the rotational wave that is input through the low noise amplifier and the sine wave from the second rotational frequency generation module.

8. A wireless communication system comprising:
multiple wireless devices,
wherein each of the multiple wireless devices includes
   a carrier wave generation module that generates a first carrier wave and a second carrier wave that have mutually different frequencies,
   a transmitter that has a rotational wave generation module which generates a rotational wave based on the first and second carrier waves,
   a rotational wave demodulation module that, for the rotational wave that is received, selectively demodulates an electric wave which has a desired rotational frequency, based on a result of multiplying a sine wave that has the same frequency as a frequency of a desired carrier wave and a sine wave that has the same frequency as the desired rotational frequency, and
   a receiver that has a rotational phase determination module which determines a phase shift of the received rotational wave from an output of the rotational wave demodulation module,
wherein the multiple wireless devices have a shared frequency in advance, and
wherein, among the multiple wireless devices, one wireless device transmits a frequency allocation request to a different wireless device at the shared frequency, and the different wireless device transmits an allocation response including a given rotational frequency to the wireless device that transmits the frequency allocation request.

9. The wireless communication system according to claim 8,
wherein the multiple wireless devices transmit and receive a transmission data frame that is configured from multiple time slots, as the rotational wave, and enables the frequency allocation requests from different wireless devices to be stored in the time slots, respectively.

10. The wireless communication system according to claim 8,
wherein a frequency band of the first carrier wave and a frequency band of the second carrier wave each are divided into a desired number of frequencies, and
wherein the rotational wave generation module generates the rotational wave based on a first carrier wave and a second carrier wave at the frequency that result from the division.

* * * * *